US012623659B2

(12) United States Patent
Wilhelmsson et al.

(10) Patent No.: US 12,623,659 B2
(45) Date of Patent: May 12, 2026

(54) COMPUTER SYSTEM AND A COMPUTER-IMPLEMENTED METHOD OF CONTROLLING THE TEMPERATURE OF A SELECTIVE CATALYTIC REDUCTION SYSTEM

(71) Applicant: Volvo Truck Corporation, Gothenburg (SE)

(72) Inventors: Martin Wilhelmsson, Torslanda (SE); Oscar Stjernberg, Gothenburg (SE); Anders Eriksson, Torslanda (SE); Erik Jonsson Holm, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/818,253

(22) Filed: Aug. 28, 2024

(65) Prior Publication Data

US 2025/0074422 A1     Mar. 6, 2025

(30) Foreign Application Priority Data

Sep. 5, 2023    (EP) ..................................... 23195472

(51) Int. Cl.
B60W 30/18          (2012.01)
B60W 10/10          (2012.01)
(Continued)

(52) U.S. Cl.
CPC ...... B60W 30/18109 (2013.01); B60W 10/10 (2013.01); B60W 10/184 (2013.01); (Continued)

(58) Field of Classification Search
CPC ........... B60W 30/18109; B60W 10/10; B60W 10/184; B60W 10/198; B60W 30/143; (Continued)

(56) References Cited

U.S. PATENT DOCUMENTS 8,352,165 B2 *    1/2013    Olsson .................... F02D 41/12
                                                      123/320
2006/0199698 A1 *    9/2006    Eriksson ............... B60W 10/18
                                                      477/92

(Continued)

FOREIGN PATENT DOCUMENTS

EP          3094837 A1     11/2016
WO     2014149297 A1      9/2014
WO     2019209158 A1     10/2019

OTHER PUBLICATIONS

Alessandrini, A. et al., "Design of a new On-board Energy Storage and Conversion System for a Fast Charging Urban Transport Electric Bus," 2021 IEEE International Conference on Environment and Electrical Engineering and 2021 IEEE Industrial and Commercial Power Systems Europe (EEEIC / I&CPS Europe), Sep. 7-10, 2021, Bari, Italy, IEEE, 6 pages.

(Continued)

*Primary Examiner* — Matthew T Largi
(74) *Attorney, Agent, or Firm* — Withrow & Terranova, PLLC

(57)          ABSTRACT

A computer system comprising processing circuitry configured to obtain topographic data containing information about the topography of the road along which a heavy-duty vehicle is currently travelling, the topographic data including information about an upcoming downhill slope; acquire prediction data indicative of the braking requirements for the upcoming downhill slope, the braking requirements including how much brake power and/or brake energy that will be needed in the upcoming downhill slope to maintain the speed of the heavy-duty vehicle at or below a selected speed limit of the heavy-duty vehicle throughout the travel in the downhill slope; determine a brake blending combination which allows a Selective Catalytic Reduction System (SCR) of the heavy-duty vehicle to be kept as warm as possible (Continued)

while still fulfilling the braking requirements; and apply the determined brake blending combination to the heavy-duty vehicle while travelling along the downhill slope.

11 Claims, 4 Drawing Sheets

(51) Int. Cl.

| | |
|---|---|
| *B60W 10/184* | (2012.01) |
| *B60W 10/198* | (2012.01) |
| *B60W 30/14* | (2006.01) |
| *F01N 3/20* | (2006.01) |
| *F02D 41/02* | (2006.01) |
| *F02D 41/12* | (2006.01) |

(52) U.S. Cl.
CPC ........ *B60W 10/198* (2013.01); *B60W 30/143* (2013.01); *F01N 3/2066* (2013.01); *F02D 41/024* (2013.01); *F02D 41/12* (2013.01); *F02D 2200/0802* (2013.01)

(58) Field of Classification Search
CPC ....... B60W 50/0097; B60W 30/18136; B60W 10/196; B60W 2050/0037; B60W 10/06; B60W 10/11; B60W 2300/125; B60W 2510/068; B60W 2530/10; B60W 2552/15; B60W 2556/10; B60W 2710/1005; B60W 2720/10; B60W 30/146; F01N 3/2066; F01N 2900/1404; F01N 2900/1602; F01N 2900/1626; F02D 41/024; F02D 41/12; F02D 2200/0802; F02D 9/06; F02D 13/04; F02D 41/0275
See application file for complete search history.

(56) References Cited

U.S. PATENT DOCUMENTS

| | | | | |
|---|---|---|---|---|
| 2008/0295485 | A1* | 12/2008 | Wiley ................. | F02D 41/0235 |
| | | | | 123/321 |
| 2016/0332631 | A1* | 11/2016 | Roos ................... | B60W 10/184 |
| 2016/0332632 | A1* | 11/2016 | Roos ................ | B60W 50/0097 |
| 2017/0129467 | A1* | 5/2017 | Karlsson ................ | B60T 8/245 |
| 2017/0144663 | A1* | 5/2017 | Karlsson ............... | B60W 10/10 |
| 2019/0322308 | A1* | 10/2019 | Adachi ................. | B60W 10/10 |
| 2019/0360415 | A1* | 11/2019 | Romanato ............ | F02D 41/405 |
| 2020/0361444 | A1* | 11/2020 | Sujan ...................... | F01N 11/00 |
| 2022/0074363 | A1 | 3/2022 | Forsberg et al. | |
| 2022/0243671 | A1* | 8/2022 | Dudar ................ | F02D 13/0249 |
| 2023/0035980 | A1* | 2/2023 | Shin ...................... | F02D 31/001 |

OTHER PUBLICATIONS

Extended European Search Report for European Patent Application No. 23195472.8, mailed Jan. 31, 2024, 9 pages.

* cited by examiner

COMPUTER SYSTEM AND A COMPUTER-IMPLEMENTED METHOD OF CONTROLLING THE TEMPERATURE OF A SELECTIVE CATALYTIC REDUCTION SYSTEM

PRIORITY APPLICATIONS

The present application claims priority to European Patent Application No. 23195472.8, filed on Sep. 5, 2023, and entitled "COMPUTER SYSTEM AND A COMPUTER-IMPLEMENTED METHOD OF CONTROLLING THE TEMPERATURE OF A SELECTIVE CATALYTIC REDUCTION SYSTEM," which is incorporated herein by reference in its entirety.

TECHNICAL FIELD

The disclosure relates generally to a computer system and to a heavy-duty vehicle comprising such a computer system. The disclosure also relates generally to a computer-implemented method. In particular aspects, the disclosure relates to a computer system and a computer-implemented method of controlling the temperature of a selective catalytic reduction system. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

For heavy-duty vehicles propelled by an internal combustion engine (ICE) it is important to have a high temperature in the exhaust after treatment system (EATS) in order to maintain low emissions of NOx, in line with legal requirements and a general desire to protect the environment. In order to enable efficient conversion of NOx into nitrogen and water, a combination of sufficient heat energy in the selective catalytic reduction system (SCR) and urea is used. Normally, the SCR is heated through the heat energy of the exhaust gases from the ICE and is able to maintain a sufficient temperature during driving. However, there are situations where the heat energy in the exhaust gases may not be sufficient to maintain a desired high temperature of the SCR to enable efficient NOx conversion. One such example may be during downhill driving. During such situations, the SCR cools down by the exhaust gases since the exhaust gases do not contain high enough heat energy.

SUMMARY

According to a first aspect of the disclosure, there is provided a computer system comprising processing circuitry configured to:
  obtain topographic data containing information about the topography of the road along which a heavy-duty vehicle is currently travelling, the topographic data including information about an upcoming downhill slope,
  acquire prediction data indicative of the braking requirements for said upcoming downhill slope, said braking requirements including how much brake power and/or brake energy that will be needed in said upcoming downhill slope to maintain the speed of the heavy-duty vehicle at or below a selected speed limit of the heavy-duty vehicle throughout the travel in the downhill slope,
  determine a brake blending combination which allows a Selective Catalytic Reduction System, SCR, of the heavy-duty vehicle to be kept as warm as possible while still fulfilling said braking requirements, and
  apply said determined brake blending combination to the heavy-duty vehicle while travelling along the downhill slope.

The first aspect of the disclosure may seek to overcome the problem of NOx emissions due to low temperature of the SCR during downhill driving of a heavy-duty vehicle. A technical benefit may include that by predicting the braking requirements that will be needed for an upcoming downhill slope, the selection of how the braking is applied may be made in such way that a high temperature of the SCR is maintained. Hereby, the risk of high NOx emissions is reduced without compromising the safety when travelling along the downhill slop. The required braking power may be applied to avoid too high speed, but is suitably selected to also maintain a high temperature of the SCR.

A heavy-duty vehicle is normally equipped with several braking systems, thus presenting different brake options for the processing circuitry as regards which one or which ones to apply. For instance, a heavy-duty vehicle may comprise service brakes, retarders, exhaust brakes, engine brakes, etc. The processing circuitry may thus select a suitable contribution by each available brake option in order to fulfil a total braking requirement. For instance, if there are four different brake options, the processing circuitry may determine to only use two of the brake options, for example applying 50% of the required brake power from each of the two selected brake options. Other contributions than 50-50 are, of course, also conceivable. In fact, the processing circuitry may decide to do a brake blending combination using 100% of one brake option, and 0% of all the other brake options. Thus, the selected brake blending combination may be any suitable contribution of the different brake options that are available and selectable by the processing circuitry, including zero contribution from one or more of the available brake options. The brake blending combination could, for example, be expressed as:

$$BP = k_1 P_1 + k_2 P_2 + \ldots + k_n P_n$$

where BP is the total brake power required in the upcoming downhill slope, and $k_n$ is a selected coefficient by the processing circuitry for the n:th brake power option $P_n$. Thus, the processing circuitry may select how much of the available brake power of each brake option that should be used to fulfill the brake requirements while keeping the SCR as warm as possible.

Optionally in some examples, including in at least one preferred example, said brake blending combination includes a brake blending of service brakes and at least one auxiliary brake such as a retarder, exhaust brake and/or engine brake. A technical benefit may include that the service brakes can provide a large amount of brake power to keep a speed limit, in particular in heavy downhill slope while allowing a high temperature be maintained at the SCR, and yet be balanced to avoid burning too much energy, by distributing some of the brake power to the auxiliary brakes.

Optionally in some examples, including in at least one preferred example, the processing circuitry may be further configured to upshift the gears for the travel along the downhill slope in addition to applying said determined brake blending combination. A technical benefit may include that upshifting may generally increase the exhaust gas temperature. In simple terms, for a heavy-duty vehicle running on a diesel engine at a certain vehicle speed, when you make a downshift, you may still run at the same vehicle speed, but the engine RPM is increased. This may cause the exhaust gas temperature to drop, since the same amount of fuel is burnt, but because of the higher RPM, more air is moved, which thus lowers the exhaust gas temperature. Conversely, in case of an upshift, the engine RPM may be decreased, moving less air, and thus allowing the exhaust gas temperature to increase.

Optionally in some examples, including in at least one preferred example, the processing circuitry may be further configured to determine the current temperature of the SCR or an expected temperature of the SCR in said upcoming downhill slope, wherein said act of applying the determined brake blending combination is performed upon determination by the processing circuitry that the determined current or expected temperature of the SCR is below a predefined threshold temperature. A technical benefit may include that the brake blending combination does not need to be applied each time the vehicle will travel in a downhill slope. If the current or expected temperature of the SCR is above the predefined threshold temperature, the processing circuitry may instead take into account other factors when deciding on braking strategy, such as eco-driving, energy recovery, etc. In case the processing circuitry determines that the decided braking strategy results in too low temperature of the SCR, it can then switch to a brake blending combination that can keep the temperature of the SCR at a higher level.

Optionally in some examples, including in at least one preferred example, the processing circuitry may further be configured to use a brake blending model to determine said brake blending combination, the brake blending model including or calculating a plurality of different actions and their individual and/or combined effect on:

the brake power, and the exhaust gas temperature and/or the resulting temperature of the SCR.

A technical benefit may be that such a brake blending model may be made readily accessible to the processing circuitry, and the processing circuitry may thus be provided with or determine a brake blending combination which fulfills brake power requirements as well as achieves a high temperature of the SCR.

Optionally in some examples, including in at least one preferred example, the brake blending model may implement cost functions where the control target is to minimize the cost. A technical benefit may include that cost functions provide a simple yet effective way of determining a suitable brake blending combination. A cost function may suitably be implemented to evaluate how the temperature of the exhaust aftertreatment system (EATS) affects the overall performance. For example, gear selection or brake power or brake type may result in a specific predicted exhaust gas temperature. The predicted exhaust gas temperature may then be compared to a predetermined temperature limit. The exhaust gas temperature should desirably stay above that predetermined temperature limit, in order to avoid losing NOx conversion performance in the SCR. If the predicted exhaust gas temperature is below the predetermined temperature limit, the brake blending model will add a cost. The cost may then be used to find the most advantageous setting and/or gear selection. The above example may be expressed as:

$$TemperatureCost =$$
$$constant * (\max(PredeterminedTempLim - predictedTemperature, 0))$$

Optionally in some examples, including in at least one preferred example, said plurality of different actions may include:

using a retarder of the heavy-duty vehicle to brake the vehicle, disengaging the clutch, setting the gear in neutral, keeping the internal combustion engine, ICE, running at idle, shutting down the ICE, using engine braking of the heavy-duty vehicle, shifting the gears, using service braking of the heavy-duty vehicle, using exhaust braking.

A technical benefit may include that providing these different options allow for a large variety of possible brake blending combinations which provides the needed brake power while keeping the SCR as warm as possible.

Optionally in some examples, including in at least one preferred example, said brake blending model may be stored in a remote server which is accessible by the heavy-duty vehicle. A technical benefit may include that having the brake blending model stored on a remote server allows many vehicles to access the brake blending model, instead of storing a brake blending model on each vehicle individually. Furthermore, a remote server may be provided with greater storage and calculating capacity than what is normally available in onboard systems.

Optionally in some examples, including in at least one preferred example, said brake blending model is stored in the processing circuitry, onboard the heavy-duty vehicle, wherein said brake blending model is uploadable to a remote server, enabling sharing of the brake blending model with other heavy-duty vehicles. A technical benefit may include that other vehicles may benefit from data collected by the present vehicle. For instance, the brake blending model may be continuously updated (using suitable feedback) based on its accuracy in determining a suitable brake blending combination and the actual resulting brake power and SCR temperature after having applied the determined brake blending combination.

Optionally in some examples, including in at least one preferred example, said topographic data may comprise information about the grade of the upcoming downhill slope, wherein the processing circuitry is further configured to:

determine the total weight of the heavy-duty vehicle, including the weight of any trailing vehicle part, wherein said prediction data is at least partly based on said determined total weight and the grade of the upcoming downhill slope. A technical benefit may include that determining the brake power needed based on the weight and the grade of the upcoming downhill slope is convenient and provides sufficient accuracy. Suitably, the brake power determination may be based on the well-known formula for an inclined plane: $a=g \cdot \sin(\theta)$, where a is the acceleration, g is the gravity of Earth, and the angle $\theta$ is the grade of the downhill slope. Thus, in order to avoid acceleration and to maintain a current cruising speed, the braking force should suitably balance the force in the inclined plane ($F=m \cdot a$, where m is the mass of the vehicle).

Optionally in some examples, including in at least one preferred example, said topographic data may comprise information about the length of the upcoming downhill slope, wherein the processing circuitry is further configured to determine said brake blending combination based on the length of the downhill slope. A technical benefit may include that by having information about the length of the downhill slope, the total brake energy that will be required may be determined by the processing circuitry, and thus, the processing circuitry may for example determine, how much of that total brake energy may be allocated to regenerative braking, and how much of the total brake energy that should be allocated to any auxiliary brake and/or service brake.

Optionally in some examples, including in at least one preferred example, said topographic data may be obtained from a Geographic Information System (GIS). A technical benefit may include that the topographic data be conveniently provided to the processing circuitry by allowing the GIS and the processing circuitry to be in operative communication with each other. The GIS may suitably be a local system installed on the vehicle. However, it is also conceivable to have a remote GIS, which communicates wirelessly, e.g. via telematics with the processing circuitry. The topographic data may, for example, cover several kilometers of the upcoming road, such as 3-5 kilometers. Thus, the acquired topographic data may in each instance normally include topographic data for a limited length of the road as a whole, i.e. the topographic data may include information about an upcoming road segment. Suitably, as the vehicle travels on that road segment, new topographic data may be acquired, for a new upcoming road segment. The new upcoming road segment may at least partly overlap the previous road segment. Thus, it should be understood that the obtaining of the topographic data by the processing circuitry may be performed repeatedly, either continuously or at certain time intervals (for example every second). It should furthermore be understood that obtaining the topographic data from a GIS is just an example, and that there are other conceivable solutions for obtaining the topographic data. For instance, the heavy-duty vehicle may include or have access to an active safety system, which may use radar echoes to do determine the current location of the vehicle by comparing the surroundings with the information in an electronically stored map.

Optionally in some examples, including in at least one preferred example, the processing circuitry may be further configured to:

access stored historical control data representing previous control actions by the processing circuitry, and determine said brake blending combination based on said accessed stored historical control data. A technical benefit may include that historical data may suitably be reused not only by the present vehicle, but also by other vehicles. For instance, historical data may be shared with or received from a remote server. The processing circuitry's ability to accurately determine a suitable brake blending combination may be continuously improved based on progressive accumulation of historical data.

Optionally in some examples, including in at least one preferred example, said historical data includes information acquired during different brake events of the heavy-duty vehicle and/or information acquired during different brake events of one or more other heavy-duty vehicles, said acquired information including information about the change in temperature of the SCR during the different brake events and different combinations of brake blending. Analogously to the above discussion, a technical benefit may include that the processing circuitry's ability to accurately determine a suitable brake blending combination may be continuously improved based on the accumulation of historical data.

Optionally in some examples, including in at least one preferred example, the processing circuitry is configured to acquiring said prediction data by determining the total brake power, $BP^{tot}$, based on the following relationships:

$$BP^{tot} = k \cdot (GP - RR - AR),$$

where k is a combined efficiency coefficient which is based on the efficiencies of components such as rear-axle, gearbox, etc.

GP is the grade power calculated as $mg \cdot \sin(\theta) \cdot v$, where m is the mass of the heavy-duty vehicle, g is the gravity, v is the speed of the vehicle and $\theta$ is arctan (grade/100);

RR is the rolling resistance power calculated as $mg \cdot \cos(\theta) \cdot v$;

AR is the aero resistance power calculated as $\frac{1}{2} \cdot \rho \cdot CdA \cdot v^3$, wherein $\rho$ is the density of air, and CdA is the coefficient of aerodynamic drag of the heavy-duty vehicle.

A technical benefit may include that by utilizing this relationship, the processing circuitry may determine the total brake power more accurately.

According to a second aspect of the disclosure, there is provided a heavy-duty vehicle comprising the computer system of the first aspect, including any examples thereof. The second aspect of the disclosure may, similarly to the first aspect, seek to overcome the problem of NOx emissions due to low temperature of the SCR during downhill driving of a heavy-duty vehicle. Technical benefits may be largely analogous to those of the first aspect, including any examples thereof.

According to a third aspect of the disclosure, there is provided a computer-implemented method of controlling, for a heavy-duty vehicle traveling along a road, the temperature of a Selective Catalytic Reduction system, SCR, which forms part of an Exhaust After-Treatment System, EATS, of the heavy-duty vehicle, the method comprising:

obtaining, by processing circuitry of a computer system, topographic data containing information about the topography of the road along which the heavy-duty vehicle is currently travelling, the topographic data including information about an upcoming downhill slope, acquiring, by the processing circuitry, prediction data indicative of the braking requirements for said upcoming downhill slope, said braking requirements including how much brake power and/or brake energy that will be needed in said upcoming downhill slope to maintain the speed of the heavy-duty vehicle at or below a selected speed limit of the heavy-duty vehicle throughout the travel in the downhill slope, determining, by the processing circuitry, a brake blending combination which allows the SCR to be kept as warm as possible while still fulfilling said braking requirements, and applying, by the processing circuitry, said determined brake blending combination to the heavy-duty vehicle while travelling along the downhill slope.

The third aspect of this disclosure may seek to overcome the corresponding problem and may have the corresponding technical benefit as the first and second aspects, including any examples thereof.

Below follows a number of optional examples of the method of the third aspect. Technical benefits of the different examples may be largely analogous to examples of the first aspect having corresponding features.

Optionally in some examples, including in at least one preferred example, the brake blending combination may include a brake blending of service brakes and at least one auxiliary brake such as a retarder, exhaust brake and/or engine brake.

Optionally in some examples, including in at least one preferred example, the method may further comprise upshifting, by the processing circuitry, the gears for the travel along the downhill slope in addition to applying said determined brake blending combination.

Optionally in some examples, including in at least one preferred example, said determining of a brake blending combination may comprise using, by the processing circuitry, a brake blending model which includes a plurality of different actions and their individual and/or combined effect on:

the brake power, and
    the exhaust gas temperature and/or the resulting temperature of the SCR.

Optionally in some examples, including in at least one preferred example, the brake blending model may implement cost functions where the control target is to minimize the cost.

Optionally in some examples, including in at least one preferred example, said plurality of different actions include:

using a retarder of the heavy-duty vehicle to brake the vehicle,
disengaging the clutch,
setting the gear in neutral,
keeping the internal combustion engine, ICE, running at idle,
shutting down the ICE,
using engine braking of the heavy-duty vehicle,
shifting the gears,
using service braking of the heavy-duty vehicle,
using exhaust braking.

Optionally in some examples, including in at least one preferred example, said brake blending model may be stored in a remote server which is accessible by the heavy-duty vehicle.

Optionally in some examples, including in at least one preferred example, said brake blending model may be stored in the processing circuitry, onboard the heavy-duty vehicle, wherein said brake blending model is uploadable to a remote server, enabling sharing of the brake blending model with other heavy-duty vehicles.

Optionally in some examples, including in at least one preferred example, said topographic data may comprise information about the grade of the upcoming downhill slope, the method further comprising:

determining, by the processing circuitry, the total weight of the heavy-duty vehicle, including the weight of any trailing vehicle part, wherein said prediction data is at least partly based on said determined total weight and the grade of the upcoming downhill slope.

Optionally in some examples, including in at least one preferred example, said topographic data may comprise information about the length of the upcoming downhill slope, the method further comprising:

determining, by the processing circuitry, said brake blending combination based on the length of the downhill slope.

Optionally in some examples, including in at least one preferred example, said topographic data may be obtained from a Geographic Information System (GIS).

Optionally in some examples, including in at least one preferred example, the method may further comprise:

accessing, by the processing circuitry, stored historical control data representing previous control actions by the processing circuitry,
wherein said act of determining a brake blending combination includes:
    determining, by the processing circuitry, said brake blending combination based on said accessed stored historical control data.

Optionally in some examples, including in at least one preferred example, said historical data may include information acquired during different brake events of the heavy-duty vehicle and/or information acquired during different brake events of one or more other heavy-duty vehicles, said acquired information including information about the change in temperature of the SCR during the different brake events and different combinations of brake blending.

Optionally in some examples, including in at least one preferred example, said act of acquiring prediction data indicative of the braking requirements comprises:

determining, by the processing circuitry, the total brake power, $BP^{tot}$, based on the following relationships:

$$BP^{tot} = k \cdot (GP - RR - AR),$$

where
k is a combined efficiency coefficient which is based on the efficiencies of components such as rear-axle, gearbox, etc.
GP is the grade power calculated as $mg \cdot \sin(\theta) \cdot v$, where m is the mass of the heavy-duty vehicle, g is the gravity, v is the speed of the vehicle and $\theta$ is arctan (grade/100);
RR is the rolling resistance power calculated as $mg \cdot \cos(\theta) \cdot v$;
AR is the aero resistance power calculated as $\frac{1}{2} \cdot \rho \cdot CdA \cdot v^3$, wherein $\rho$ is the density of air, and CdA is the coefficient of aerodynamic drag of the heavy-duty vehicle.

According to a fourth aspect of this disclosure there is provided a computer program product comprising program code for performing, when executed by the processing circuitry, the method of the third aspect, including any examples thereof. Technical benefits of the fourth aspect may be largely analogous to those of the third aspect, including any examples thereof.

According to a fifth aspect of this disclosure there is provided non-transitory computer-readable storage medium comprising instructions, which when executed by the processing circuitry, cause the processing circuitry to perform the method of the third aspect, including any examples thereof. Technical benefits of the fifth aspect may be largely analogous to those of the third aspect, including any examples thereof.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

For heavy-duty vehicles propelled by an internal combustion engine (ICE) it is important to have a high temperature in the exhaust after treatment system (EATS) in order to maintain low emissions of NOx, in line with legal requirements and a general desire to protect the environment. In order to enable efficient conversion of NOx into nitrogen and water, a combination of sufficient heat energy in the selective catalytic reduction system (SCR) and urea is used. In order to reduce the risk of the temperature of the SCR dropping in certain driving scenarios, such as during downhill driving, the present disclosure proposes a computer system and a method which can take into account both the braking requirements as well as keeping the SCR at a high temperature. In particular, a brake blending combination may be determined by a processing circuitry, which brake blending combination allows the SCR of the heavy-duty vehicle to be kept as warm as possible while still fulfilling said braking requirements.

Figures 1, 2:
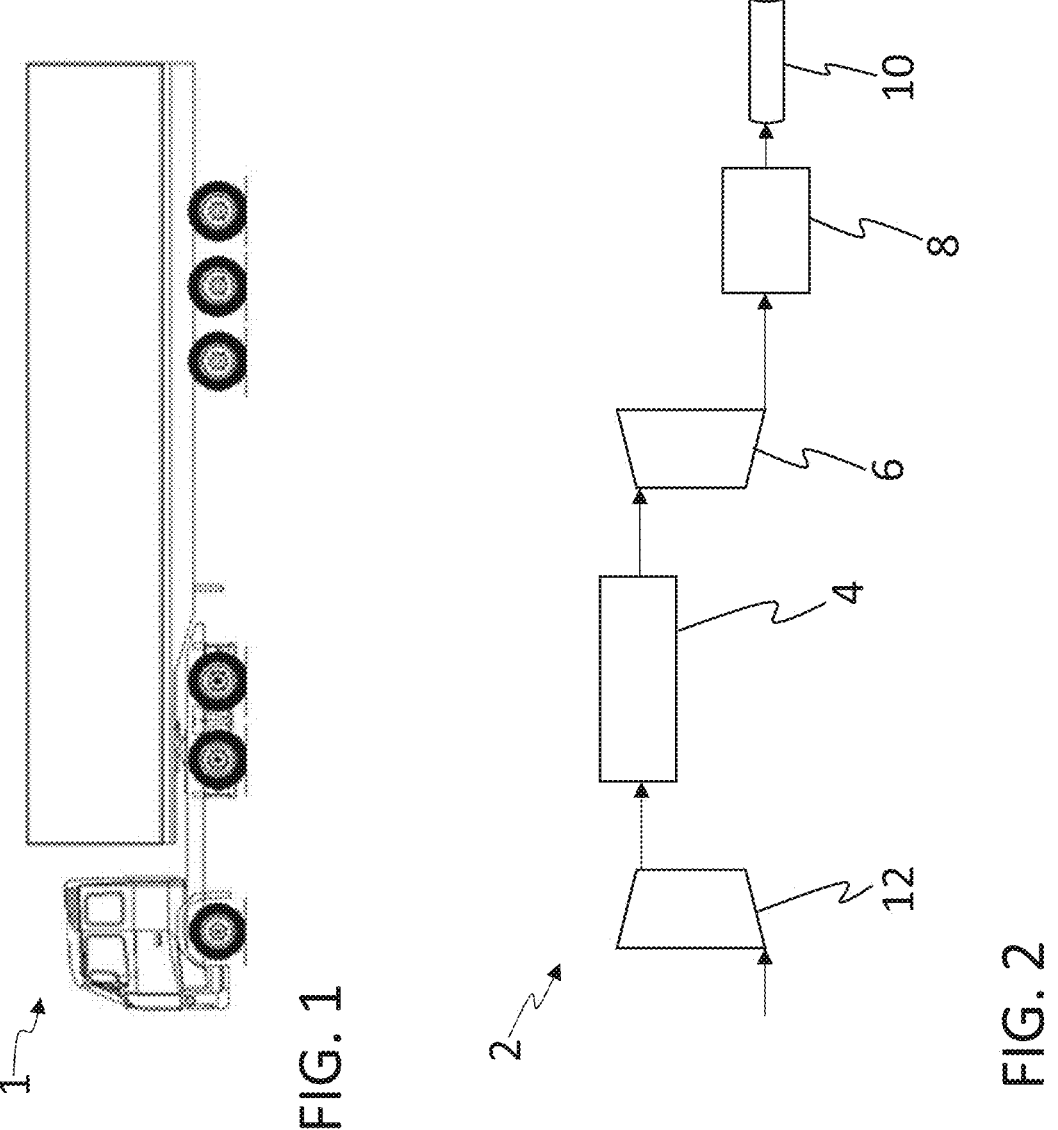
FIG. 1 illustrates schematically a heavy-duty vehicle according to at least one example of the disclosure.
FIG. 2 illustrates schematically an example of an internal combustion engine system that may be used in the heavy-duty vehicle of FIG. 1

FIG. 1 illustrates schematically a heavy-duty vehicle 1 according to at least one example of the disclosure. In this example, the heavy-duty vehicle 1 is in the form of a tractor unit which is pulling a trailer unit. The tractor unit comprises an internal combustion engine (ICE) providing propulsion to the vehicle. Although a specific vehicle combination has been illustrated, it should be understood that the teachings of the present disclosure may also be implemented in other types of vehicles, such as busses and construction equipment. The illustrated heavy-duty vehicle 1 comprises a cabin in which a driver may operate the vehicle. However, it should be understood that the teachings in this disclosure may also be implemented in an autonomous (self-driving) heavy-duty vehicle.

FIG. 2 illustrates schematically an example of an internal combustion engine system 2 that may be used in the heavy-duty vehicle 1 of FIG. 1. The arrowed solid lines illustrate fluid flow paths. The internal combustion engine system 2 comprises an ICE 4 in which fuel is combusted. Exhaust gases exiting the ICE 4 are delivered to and causes rotation of a turbine 6. After exiting the turbine 6, the exhaust gas continues to the exhaust aftertreatment system (EATS) 8, which limits the amount of environmentally harmful pollutants that exit the vehicle through a tail pipe 10. The EATS 8 comprises an SCR, but may also comprise one or more other exhaust aftertreatment devices, such as a diesel oxidation catalyst (DOC) and/or a diesel particular filter (DPF). The turbine 6 is mechanically coupled (not shown), such as via a shaft, to a compressor 12. The rotational motion of the turbine 6 is thereby transferred to a corresponding motion of the compressor 12. Air is sucked into the rotating compressor 12, which pressurizes the air and delivers it to an intake manifold of the ICE 4. Although not illustrated in FIG. 2, the internal combustion engine system 2 may include various other commonly used components and sub-systems, such as one or more exhaust gas recirculation (EGR) passages, pumps, cooler, throttle, wastegate and other valves, etc.

Figure 3:
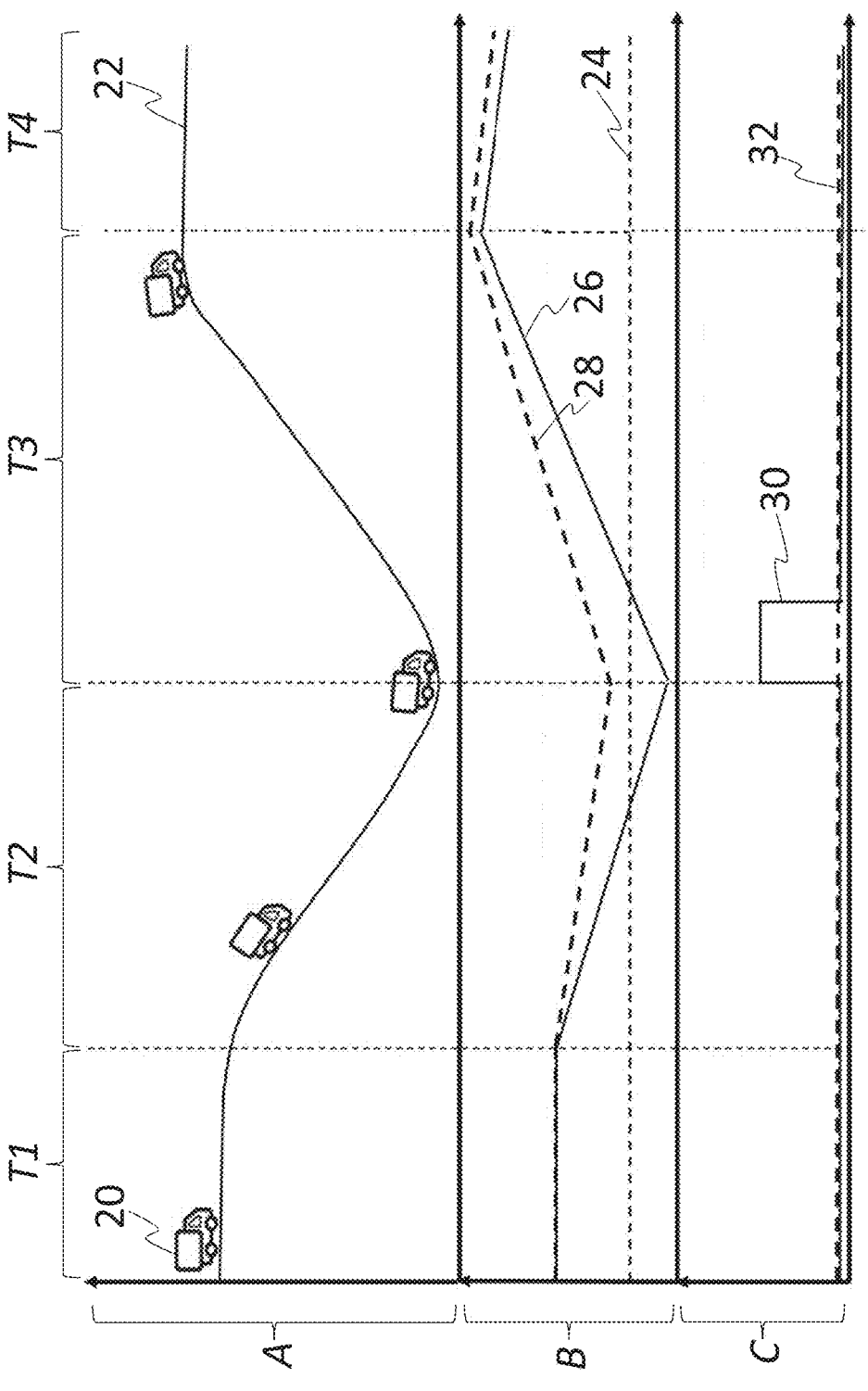
FIG. 3 is a schematic illustration of a brake event in which the teaching of the present disclosure is implemented.

FIG. 3 is a schematic illustration of a brake event in which the teaching of the present disclosure is implemented. FIG. 3 illustrates a heavy-duty vehicle 20 approaching a downhill slope, then driving in the downhill slope, and the continuing in an uphill climb, and finally reaching a plateau. The heavy-duty vehicle 20 is illustrated as a truck, although the following discussion is valid also for other types of heavy-duty vehicles. Heavy-duty vehicles require relatively high braking power in downhill travel compared to lighter vehicles such as cars.

In more detail, the schematic diagram in FIG. 3 is divided into three horizontal sections. A first horizontal section A, at the top of the diagram, represents the topography of a road segment 22 along which the heavy-duty vehicle 20 travels. A second horizontal section B represents the temperature of the SCR. In this second horizontal section B, the straight horizontal dashed line 24 illustrates a minimum temperature of the SCR that is required for satisfactory NOx conversion. In this second horizontal section B, the solid curve 26 illustrates how the temperature of the SCR may vary if traditional braking strategies are used instead of the teachings of this disclosure. In contrast, the dashed curve 28 illustrates how the temperature of the SCR may vary when the teachings of the present disclosure are implemented. A third horizontal section C represents the NOx emission from the heavy-duty vehicle 20. The solid curve 30 in the third horizontal section C illustrates how the NOx emissions may vary when traditional braking strategies are used instead of the teachings of this disclosure. In contrast, the dashed line 32 illustrates an example of the NOx emissions when the teachings of the present disclosure are implemented.

The schematic diagram in FIG. 3 is also divided into four vertical sections T1-T4. The four vertical sections T1-T4 may, for instance, be considered to represent different time slots. The first vertical section T1 represents the time during which the heavy-duty vehicle 20 is initially travelling on a relatively flat part of the illustrated road segment 22. Next, in the second vertical section T2, the heavy-duty vehicle 20 drives in a downhill slope. In the third vertical section T3, the heavy-duty vehicle 20 has come out of the downhill slope and climbs up a hill. In the fourth vertical section T4, the heavy-duty vehicle 20 has reached a plateau and is thus once again travelling on a substantially flat part of the illustrated road segment 22.

When the heavy-duty vehicle 20 is initially travelling on the substantially flat part of the road segment, at T1, fuel is combusted in the ICE and the exhaust gas that exits the ICE has a high temperature. As illustrated in horizontal section B, the high temperature of the exhaust gas will keep the temperature of the SCR at a high level, well above the required minimum temperature for satisfactory NOx conversion. For example, the temperature of the exhaust gas may be more than 250° C. This is true for both the solid curve 26 and the dashed curve 28.

When the heavy-duty vehicle 20 starts travelling in the downhill slope, at T2, the ICE will traditionally not discharge exhaust gas of high enough temperature, since less fuel is combusted. Thus, if the teachings of the present disclosure are not implemented, but instead a traditional braking strategy is used during the descent, the heavy-duty vehicle 20 will use its brakes, such as the engine brake, thereby pumping relatively cool air (for example less than 200° C.) through the exhaust, resulting in a cooling of the SCR. In such case, the requested engine braking power is not high enough to maintain a warm temperature in the SCR. As illustrated by the solid curve 26 in horizontal section B, the temperature of the SCR will therefore gradually become lower and may eventually become lower than the required minimum temperature illustrated by the straight dashed line 24.

With such traditional braking strategies, after the downhill driving the SCR is relatively cool (for example less than 200° C.) and converting NOx emissions efficiently enough is not possible. Therefore, when the heavy-duty vehicle 20 starts its uphill climb, at T3, the NOx emissions from the engine are high (as illustrated in horizontal section C) and the SCR is still relatively cool. Therefore, NOx emissions will be high until the SCR has had time to heat up again. After the SCR has been heated up again, the NOx emissions once again become low.

In contrast to the traditional braking strategies, by implementing the teachings of the present disclosure, the temperature of the SCR may be kept at a temperature level that is higher than the required minimum temperature, as illustrated by the dashed curve 28 compared to the straight dashed line 24. In other words, the temperature can be kept high enough even in the downhill slope, at T2. Before the descent, processing circuitry determines upcoming braking requirements (brake power and/brake energy). The processing circuitry then determines a brake blending combination to keep the SCR as warm as possible, which still fulfills the braking requirements. As will be discussed later, there may be various brake blending combinations. For example, the processing circuitry may determine to use a retarder and disengage the clutch (or putting the gear in neutral while keeping the ICE running at idle or shutting it down), in order to reduce pumping of relatively cool exhaust gas through the EATS. Another option could be to use engine brake together with appropriate gear selection if the processing circuitry determines that high enough exhaust temperatures can be achieved. The engine brake may, for example, run with short burst to maintain high exhaust temperature. During the descent a mix combination of brakes can be used.

As can be seen in FIG. 3, by implementing the teachings of this disclosure, after the downhill travel, i.e., at T3, the SCR is sufficiently warm to convert NOx emissions. The heavy-duty vehicle 20 can the maintain the high NOx conversion during the whole uphill drive. This may enable the ICE to run in a fuel-eco mode with higher engine out NOx during the uphill drive.

Figure 4:
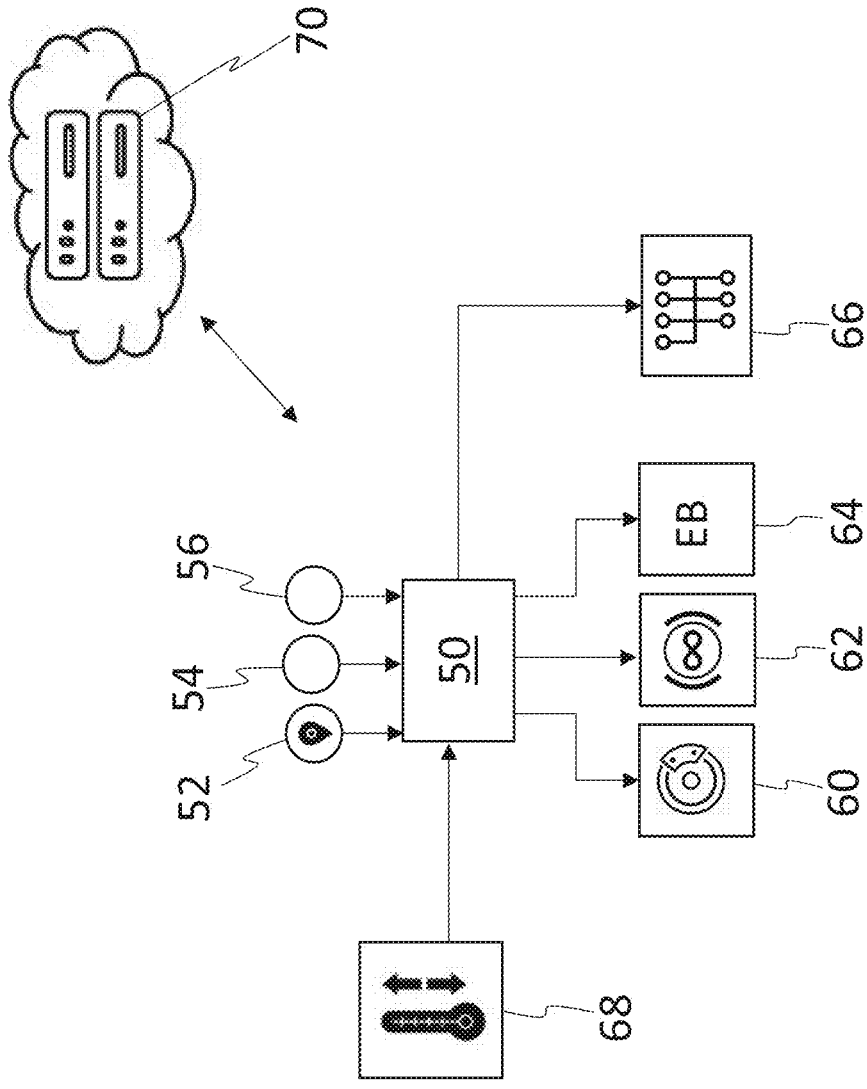
FIG. 4 illustrates schematically components that may be included when implementing the teachings of the present disclosure, according to at least one example.

FIG. 4 illustrates schematically components that may be included when implementing the teachings of the present disclosure, according to at least one example. Heavy-duty vehicles, such as the heavy-duty vehicles 1 and 20 in FIGS. 1 and 3 may include such components. In FIG. 4 there is schematically illustrated processing circuitry 50 that forms part of a computer system of a heavy-duty vehicle.

The heavy-duty vehicle may have a plurality of different input devices/systems 52, 54, 56, which may provide different types of information to the processing circuitry 50. For simplicity, FIG. 4 only illustrates three input devices/systems 52, 54, 56, however, it should be understood that there may be many more. Examples of input devices/systems may be different sensors, such as speed sensors, load sensors, user interface, etc. One of said input devices/systems 52 may be a system from which the processing circuitry 50 may obtain information about an upcoming part of a road along which the heavy-duty vehicle is currently travelling. For instance, it may be in the form of a Geographic Information System (GIS) 52. More specifically, the input device/system such as the GIS 52 may provide topographic data containing information about the topography of an upcoming part of the road, such as a downhill slope. The processing circuitry 50 is thus configured to obtain topographic data containing information about the topography of the road along which a heavy-duty vehicle is currently travelling, wherein the topographic data includes information about an upcoming downhill slope. For example, the processing circuitry 50 may, with respect to the illustration in FIG. 3, before the heavy-duty vehicle 20 reaches the downhill slope (at T2), receive information about that upcoming downhill slope. It should be understood that obtaining the topographic data from the GIS 52 is just one example, and that other options for obtaining the topographic data are also conceivable, as already discussed in this disclosure.

The processing circuitry 50 is also configured to acquire prediction data indicative of the braking requirements for the upcoming downhill slope, wherein the braking requirements include how much brake power and/or brake energy that will be needed in the upcoming downhill slope to maintain the speed of the heavy-duty vehicle at or below a selected speed limit of the heavy-duty vehicle throughout the travel in the downhill slope. The braking requirements may be dependent on various parameters, including vehicle speed, weight, grade and length of the downhill slope. Values for the parameters may be obtained by the processing circuitry 50 from the different input devices/systems 52, 54, 56. Based on the input obtained by the processing circuitry 50, it can predict the braking requirements that will be needed for the upcoming downhill slope.

FIG. 4 also illustrates that the processing circuitry 50 may control different brake options. As a purely, illustrative example, three brake systems 60, 62, 64 are illustrated, however, other number of brake systems are conceivable. In FIG. 4 there is illustrated a service brake 60, a retarder 62, and an exhaust brake or engine brake 64. The processing circuitry 50 may thus be operatively connected to each one of the brake systems 60, 62, 64. The processing circuitry 50 may therefore control each one of the brake systems 60, 62, 64 individually or in combination to provide a brake power to the heavy-duty vehicle.

The processing circuitry 50 is further configured to determine a brake blending combination which allows an SCR of the heavy-duty vehicle to be kept as warm as possible while still fulfilling the braking requirements, and to apply the determined brake blending combination to the heavy-duty vehicle while travelling along the downhill slope.

As already discussed elsewhere in this disclosure, a brake blending combination may include allocating a coefficient or a factor to each potential brake power that may be applied by the different brake systems 60, 62, 64. Such a factor may, for example, vary between 0-100%. In the example of FIG. 4, the processing circuitry 50 may in some scenarios determine that all three brake systems 60, 62, 64 should contribute with brake power. In other scenarios, the processing circuitry 50 may determine that only two of the brake systems 60, 62, 64 should contribute with brake power, thus setting the factor to 0% for one of the brake systems 60, 62, 64. In yet other scenarios that processing circuitry 50 may determine that a brake blending combination should be used in which the factor is set to 0% for all brake systems except for one.

FIG. 4 also illustrates that the processing circuitry 50 may be in operative control with the gears 66 of the vehicle. The processing circuitry 50 may therefore be configured to upshift the gears 66 for the travel along the downhill slope in addition to applying said determined brake blending combination. As discussed elsewhere in this disclosure, by controlling an upshifting of the gears 66, the engine RPM may be decreased, moving less air, and thus allowing the exhaust gas temperature to increase, thereby being beneficial to keeping the SCR warm.

The processing circuitry 50 may also be in operative communication with a temperature sensor 68 or other temperature estimating device. The temperature sensor 68 may measure or estimate the temperature of exhaust gases and/or of the SCR. The processing circuitry 50 may therefore receive input from such a temperature sensor 68 in order to determine the current temperature of the SCR or an expected temperature of the SCR in said upcoming downhill slope. The act of applying the determined brake blending combination may therefore be performed upon determination by the processing circuitry 50 that the determined current or expected temperature of the SCR is below a predefined threshold temperature. For instance, the processing circuitry 50 may determine that for a certain downhill slope the SCR temperature is not expected to fall below a required minimum temperature for efficient NOx conversion, and may therefore not need to apply a brake blending combination that keeps the SCR as warm as possible, whereas for another upcoming downhill slope the processing circuitry 50 estimates that the temperature of the SCR will become too low, and therefore decides to apply a brake blending combination that keeps the SCR as warm as possible while still fulfilling the braking requirements.

The processing circuitry 50 may further be configured to use a brake blending model to determine the brake blending combination, the brake blending model including or calculating a plurality of different actions and their individual and/or combined effect on the brake power and on the exhaust gas temperature and/or the resulting temperature of the SCR. The brake blending model may, for instance, implement cost functions where the control target is to minimize the cost. The different actions may, as already discussed previously, include using the retarder 62 of the heavy-duty vehicle to brake the vehicle, disengaging the clutch, setting the gear 66 in neutral, keeping the ICE running at idle, shutting down the ICE, using engine braking 64 of the heavy-duty vehicle, shifting the gears 66, using service braking 60 of the heavy-duty vehicle, and using exhaust braking. As illustrated in FIG. 4 the brake blending model may be stored in a remote server 70 which is accessible by the heavy-duty vehicle, in particular by the processing circuitry 50 of the heavy-duty vehicle. In other examples, the brake blending model may be stored in the processing circuitry 50, onboard the heavy-duty vehicle. The processing circuitry 50 may, in such case, upload the brake blending model to the remote server 70, enabling sharing of the brake blending model with other heavy-duty vehicles. The processing circuitry 50 may further be configured to access stored historical control data representing previous control actions by the processing circuitry, and determine said brake blending combination based on the accessed historical control data. The stored historical control data may be stored locally at the processing circuitry 50 or remotely at the remote server 70. The historical control data may include information acquired during different brake events of one or more other heavy-duty vehicles, said acquired information including information about the change in temperature of the SCR during the different brake events and different combinations of brake blending.

In at least some examples, the brake blending model may include a global self-learning model (e.g., machine learning algorithm). The processing circuitry 50 may apply a certain brake blending combination in a downhill slope based on its determination of braking requirements and striving to keep the SCR as warm as possible. Upon completion of the downhill travel, e.g., when travelling along a substantially flat surface and the temperature of the SCR has become stabilized, the global self-learning model may be updated based on the accuracy of the determined brake blending combination. The updating of the global self-learning model enables improvement of the correlation between future determined brake blending combinations and accuracy in successfully keeping the SCR as warm as possible, while still fulfilling the braking requirements for the downhill slopes.

Figure 6:
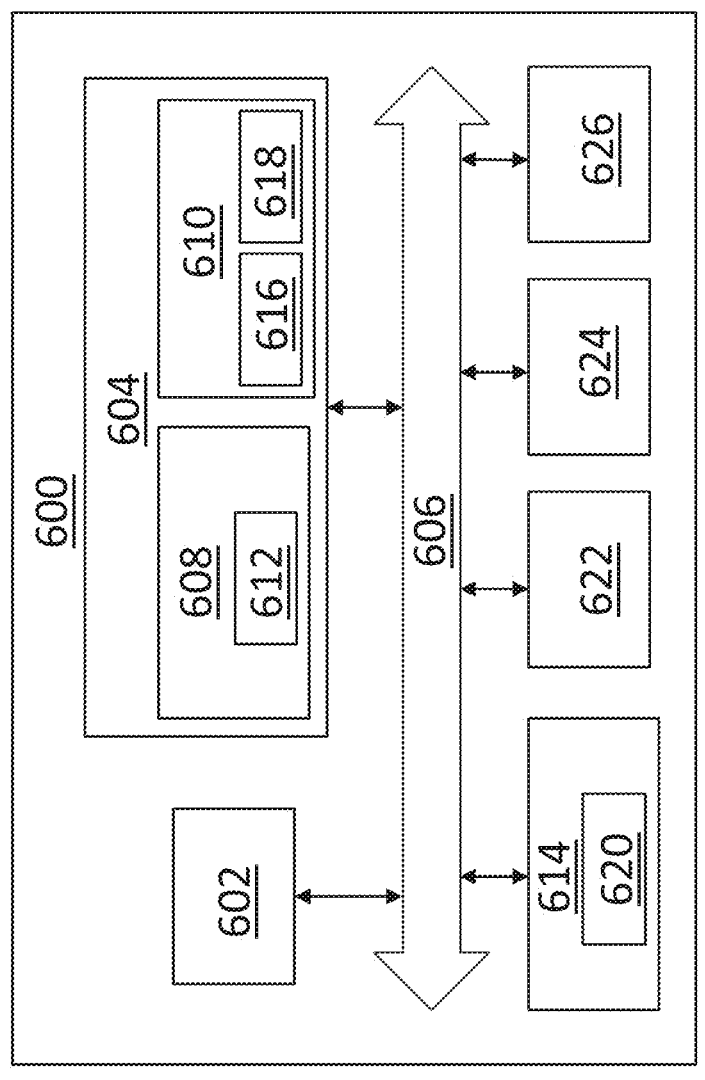
FIG. 6 is a schematic diagram of an exemplary computer system for implementing examples disclosed herein, according to an example.
Figure 5:
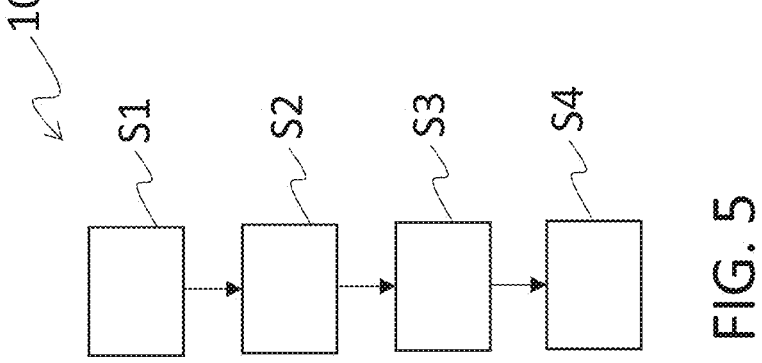
FIG. 5 is a schematic illustration of a computer-implemented method, in accordance with at least one example of the present disclosure.

FIG. 5 is a schematic illustration of a computer-implemented method, in accordance with at least one example of the present disclosure. In particular, FIG. 5 illustrates a computer-implemented method 100 of controlling, for a heavy-duty vehicle traveling along a road, the temperature of a Selective Catalytic Reduction system, SCR, which forms part of an Exhaust After-Treatment System, EATS, of the heavy-duty vehicle, the method comprising:

obtaining (S1), by processing circuitry of a computer system, topographic data containing information about the topography of the road along which the heavy-duty vehicle is currently travelling, the topographic data including information about an upcoming downhill slope, acquiring (S2), by the processing circuitry, prediction data indicative of the braking requirements for said upcoming downhill slope, said braking requirements including how much brake power and/or brake energy that will be needed in said upcoming downhill slope to maintain the speed of the heavy-duty vehicle at or below a selected speed limit of the heavy-duty vehicle throughout the travel in the downhill slope, determining (S3), by the processing circuitry, a brake blending combination which allows the SCR to be kept as warm as possible while still fulfilling said braking requirements, and applying (S4), by the processing circuitry, said determined brake blending combination to the heavy-duty vehicle while travelling along the downhill slope FIG. 6 is a schematic diagram of a computer system 600 for implementing examples disclosed herein. The computer system 600 is adapted to execute instructions from a computer-readable medium to perform these and/or any of the functions or processing described herein. The computer system 600 may be connected (e.g., networked) to other machines in a LAN, an intranet, an extranet, or the Internet. While only a single device is illustrated, the computer system 600 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 600 may comprise at least one computing device or electronic device capable of including firmware, hardware, and/or executing software instructions to implement the functionality described herein. The computer system 600 may include processing circuitry 602 (e.g., processing circuitry including one or more processor devices or control units), a memory 604, and a system bus 606. The processing circuitry 602 may, for instance, correspond to the processing circuitry 50 in FIG. 4. The computer system 600 may include at least one computing device having the processing circuitry 602. The system bus 606 provides an interface for system components including, but not limited to, the memory 604 and the processing circuitry 602. The processing circuitry 602 may include any number of hardware components for conducting data or signal processing or for executing computer code stored in memory 604. The processing circuitry 602 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 602 may further include computer executable code that controls operation of the programmable device.

The system bus 606 may be any of several types of bus structures that may further interconnect to a memory bus (with or without a memory controller), a peripheral bus, and/or a local bus using any of a variety of bus architectures. The memory 604 may be one or more devices for storing data and/or computer code for completing or facilitating methods described herein. The memory 604 may include database components, object code components, script components, or other types of information structure for supporting the various activities herein. Any distributed or local memory device may be utilized with the systems and methods of this description. The memory 604 may be communicably connected to the processing circuitry 602 (e.g., via a circuit or any other wired, wireless, or network connection) and may include computer code for executing one or more processes described herein. The memory 604 may include non-volatile memory 608 (e.g., read-only memory (ROM), erasable programmable read-only memory (EPROM), electrically erasable programmable read-only memory (EEPROM), etc.), and volatile memory 610 (e.g., random-access memory (RAM)), or any other medium which can be used to carry or store desired program code in the form of machine-executable instructions or data structures and which can be accessed by a computer or other machine with processing circuitry 602. A basic input/output system (BIOS) 612 may be stored in the non-volatile memory 608 and can include the basic routines that help to transfer information between elements within the computer system 600.

The computer system 600 may further include or be coupled to a non-transitory computer-readable storage medium such as the storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 614 and/or in the volatile memory 610, which may include an operating system 616 and/or one or more program modules 618. All or a portion of the examples disclosed herein may be implemented as a computer program 620 stored on a transitory or non-transitory computer-usable or computer-readable storage medium (e.g., single medium or multiple media), such as the storage device 614, which includes complex programming instructions (e.g., complex computer-readable program code) to cause the processing circuitry 602 to carry out actions described herein. Thus, the computer-readable program code of the computer program 620 can comprise software instructions for implementing the functionality of the examples described herein when executed by the processing circuitry 602. In some examples, the storage device 614 may be a computer program product (e.g., readable storage medium) storing the computer program 620 thereon, where at least a portion of a computer program 620 may be loadable (e.g., into a processor) for implementing the functionality of the examples described herein when executed by the processing circuitry 602. The processing circuitry 602 may serve as a controller or control system for the computer system 600 that is to implement the functionality described herein.

The computer system 600 may include an input device interface 622 configured to receive input and selections to be communicated to the computer system 600 when executing instructions, such as from a keyboard, mouse, touch-sensitive surface, etc. Such input devices may be connected to the processing circuitry 602 through the input device interface 622 coupled to the system bus 606 but can be connected through other interfaces, such as a parallel port, an Institute of Electrical and Electronic Engineers (IEEE) 1394 serial port, a Universal Serial Bus (USB) port, an IR interface, and the like. The computer system 600 may include an output device interface 624 configured to forward output, such as to a display, a video display unit (e.g., a liquid crystal display (LCD) or a cathode ray tube (CRT)). The computer system 600 may include a communications interface 626 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1: A computer system comprising processing circuitry configured to:

obtain topographic data containing information about the topography of the road along which a heavy-duty vehicle is currently travelling, the topographic data including information about an upcoming downhill slope, acquire prediction data indicative of the braking requirements for said upcoming downhill slope, said braking requirements including how much brake power and/or brake energy that will be needed in said upcoming downhill slope to maintain the speed of the heavy-duty vehicle at or below a selected speed limit of the heavy-duty vehicle throughout the travel in the downhill slope, determine a brake blending combination which allows a Selective Catalytic Reduction System, SCR, of the heavy-duty vehicle to be kept as warm as possible while still fulfilling said braking requirements, and apply said determined brake blending combination to the heavy-duty vehicle while travelling along the downhill slope.

Example 2: The computer system of example 1, wherein said brake blending combination includes a brake blending of service brakes and at least one auxiliary brake such as a retarder, exhaust brake and/or engine brake.

Example 3: The computer system of any of examples 1-2, wherein the processing circuitry is further configured to upshift the gears for the travel along the downhill slope in addition to applying said determined brake blending combination.

Example 4: The computer system of any one of examples 1-3, wherein the processing circuitry is further configured to determine the current temperature of the SCR or an expected temperature of the SCR in said upcoming downhill slope, wherein said act of applying the determined brake blending combination is performed upon determination by the processing circuitry that the determined current or expected temperature of the SCR is below a predefined threshold temperature.

Example 5: The computer system of any of examples 1-4, wherein the processing circuitry is further configured to use a brake blending model to determine said brake blending combination, the brake blending model including or calculating a plurality of different actions and their individual and/or combined effect on:

the brake power, and the exhaust gas temperature and/or the resulting temperature of the SCR.

Example 6: The computer system of example 5, wherein the brake blending model implements cost functions where the control target is to minimize the cost.

Example 7: The computer system of any of examples 5 or 6, wherein said plurality of different actions include:

using a retarder of the heavy-duty vehicle to brake the vehicle, disengaging the clutch, setting the gear in neutral, keeping the internal combustion engine, ICE, running at idle, shutting down the ICE, using engine braking of the heavy-duty vehicle, shifting the gears, using service braking of the heavy-duty vehicle, using exhaust braking.

Example 8: The computer system of any of examples 5-7, wherein said brake blending model is stored in a remote server which is accessible by the heavy-duty vehicle.

Example 9: The computer system of any of examples 5-8, wherein said brake blending model is stored in the processing circuitry, onboard the heavy-duty vehicle, wherein said brake blending model is uploadable to a remote server, enabling sharing of the brake blending model with other heavy-duty vehicles.

Example 10: The computer system of any of examples 1-9, wherein said topographic data comprises information about the grade of the upcoming downhill slope, wherein the processing circuitry is further configured to:

determine the total weight of the heavy-duty vehicle, including the weight of any trailing vehicle part, wherein said prediction data is at least partly based on said determined total weight and the grade of the upcoming downhill slope.

Example 11: The computer system of any of examples 1-10, wherein said topographic data comprises information about the length of the upcoming downhill slope, wherein the processing circuitry is further configured to:

determine said brake blending combination based on the length of the downhill slope.

Example 12: The computer system of any of examples 1-11, wherein said topographic data is obtained from a Geographic Information System (GIS).

Example 13: The computer system of any of examples 1-12, wherein the processing circuitry is further configured to:

access stored historical control data representing previous control actions by the processing circuitry, and determine said brake blending combination based on said accessed stored historical control data.

Example 14: The computer system of example 13, wherein said historical data includes information acquired during different brake events of the heavy-duty vehicle and/or information acquired during different brake events of one or more other heavy-duty vehicles, said acquired information including information about the change in temperature of the SCR during the different brake events and different combinations of brake blending.

Example 15: The computer system of any of examples 1-14, wherein the processing circuitry is configured to acquiring said prediction data by determining the total brake power, BPtot, based on the following relationships:

$$BPtot = k \cdot (GP - RR - AR),$$

where k is a combined efficiency coefficient which is based on the efficiencies of components such as rear-axle, gearbox, etc.

GP is the grade power calculated as mg·sin(θ)·v, where m is the mass of the heavy-duty vehicle, g is the gravity, v is the speed of the vehicle and θ is arctan (grade/100);

RR is the rolling resistance power calculated as mg·cos (θ)·v;

AR is the aero resistance power calculated as ½·ρ·CdA·v3, wherein ρ is the density of air, and CdA is the coefficient of aerodynamic drag of the heavy-duty vehicle.

Example 16: A heavy-duty vehicle comprising the computer system of any of examples 1-15.

Example 17: A computer-implemented method of controlling, for a heavy-duty vehicle traveling along a road, the temperature of a Selective Catalytic Reduction system, SCR, which forms part of an Exhaust After-Treatment System, EATS, of the heavy-duty vehicle, the method comprising:

obtaining, by processing circuitry of a computer system, topographic data containing information about the topography of the road along which the heavy-duty vehicle is currently travelling, the topographic data including information about an upcoming downhill slope, acquiring, by the processing circuitry, prediction data indicative of the braking requirements for said upcoming downhill slope, said braking requirements including how much brake power and/or brake energy that will be needed in said upcoming downhill slope to maintain the speed of the heavy-duty vehicle at or below a selected speed limit of the heavy-duty vehicle throughout the travel in the downhill slope, determining, by the processing circuitry, a brake blending combination which allows the SCR to be kept as warm as possible while still fulfilling said braking requirements, and applying, by the processing circuitry, said determined brake blending combination to the heavy-duty vehicle while travelling along the downhill slope.

Example 18: The method of example 17, wherein said brake blending combination includes a brake blending of service brakes and at least one auxiliary brake such as a retarder, exhaust brake and/or engine brake.

Example 19: The method of any of examples 17-18, further comprising upshifting, by the processing circuitry, the gears for the travel along the downhill slope in addition to applying said determined brake blending combination.

Example 20: The method of any of examples 17-19, wherein said determining of a brake blending combination comprises using, by the processing circuitry, a brake blending model which includes a plurality of different actions and their individual and/or combined effect on:

the brake power, and the exhaust gas temperature and/or the resulting temperature of the SCR.

Example 21: The method of example 20, wherein the brake blending model implements cost functions where the control target is to minimize the cost.

Example 22: The method of example 20 or 21, wherein said plurality of different actions include:

using a retarder of the heavy-duty vehicle to brake the vehicle, disengaging the clutch, setting the gear in neutral, keeping the internal combustion engine, ICE, running at idle, shutting down the ICE, using engine braking of the heavy-duty vehicle, shifting the gears, using service braking of the heavy-duty vehicle, using exhaust braking.

Example 23: The method of any of examples 20-22, wherein said brake blending model is stored in a remote server which is accessible by the heavy-duty vehicle.

Example 24: The method of any of examples 20-23, wherein said brake blending model is stored in the processing circuitry, onboard the heavy-duty vehicle, wherein said brake blending model is uploadable to a remote server, enabling sharing of the brake blending model with other heavy-duty vehicles.

Example 25: The method of any of examples 17-24, wherein said topographic data comprises information about the grade of the upcoming downhill slope, the method further comprising:

determining, by the processing circuitry, the total weight of the heavy-duty vehicle, including the weight of any trailing vehicle part, wherein said prediction data is at least partly based on said determined total weight and the grade of the upcoming downhill slope.

Example 26: The method of any of examples 17-25, wherein said topographic data comprises information about the length of the upcoming downhill slope, the method further comprising:

determining, by the processing circuitry, said brake blending combination based on the length of the downhill slope.

Example 27: The method of any of examples 17-26, wherein said topographic data is obtained from a Geographic Information System (GIS).

Example 28: The method of any of examples 17-27, further comprising:

accessing, by the processing circuitry, stored historical control data representing previous control actions by the processing circuitry, wherein said act of determining a brake blending combination includes:

determining, by the processing circuitry, said brake blending combination based on said accessed stored historical control data.

Example 29: The method of example 28, wherein said historical data includes information acquired during different brake events of the heavy-duty vehicle and/or information acquired during different brake events of one or more other heavy-duty vehicles, said acquired information including information about the change in temperature of the SCR during the different brake events and different combinations of brake blending.

Example 30: The method of any of examples 17-29, wherein said act of acquiring prediction data indicative of the braking requirements comprises:

determining, by the processing circuitry, the total brake power, $BP^{tot}$, based on the following relationships:

$$BPtot = k \cdot (GP - RR - AR),$$

where k is a combined efficiency coefficient which is based on the efficiencies of components such as rear-axle, gearbox, etc.

GP is the grade power calculated as mg·sin(θ)·v, where m is the mass of the heavy-duty vehicle, g is the gravity, v is the speed of the vehicle and θ is arctan (grade/100);

RR is the rolling resistance power calculated as mg·cos
(θ)·v;

AR is the aero resistance power calculated as
½·ρ·CdA·v3, wherein ρ is the density of air, and CdA
is the coefficient of aerodynamic drag of the heavy-duty
vehicle.

Example 31: A computer program product comprising
program code for performing, when executed by the pro-
cessing circuitry, the method of any of examples 17-30.

Example 32: A non-transitory computer-readable storage
medium comprising instructions, which when executed by
the processing circuitry, cause the processing circuitry to
perform the method of any of examples 17-30.

The terminology used herein is for the purpose of describ-
ing particular aspects only and is not intended to be limiting
of the disclosure. As used herein, the singular forms "a,"
"an," and "the" are intended to include the plural forms as
well, unless the context clearly indicates otherwise. As used
herein, the term "and/or" includes any and all combinations
of one or more of the associated listed items. It will be
further understood that the terms "comprises," "compris-
ing," "includes," and/or "including" when used herein
specify the presence of stated features, integers, actions,
steps, operations, elements, and/or components, but do not
preclude the presence or addition of one or more other
features, integers, actions, steps, operations, elements, com-
ponents, and/or groups thereof.

It will be understood that, although the terms first, second,
etc., may be used herein to describe various elements, these
elements should not be limited by these terms. These terms
are only used to distinguish one element from another. For
example, a first element could be termed a second element,
and, similarly, a second element could be termed a first
element without departing from the scope of the present
disclosure.

Relative terms such as "below" or "above" or "upper" or
"lower" or "horizontal" or "vertical" may be used herein to
describe a relationship of one element to another element as
illustrated in the Figures. It will be understood that these
terms and those discussed above are intended to encompass
different orientations of the device in addition to the orien-
tation depicted in the Figures. It will be understood that
when an element is referred to as being "connected" or
"coupled" to another element, it can be directly connected or
coupled to the other element, or intervening elements may
be present. In contrast, when an element is referred to as
being "directly connected" or "directly coupled" to another
element, there are no intervening elements present.

Unless otherwise defined, all terms (including technical
and scientific terms) used herein have the same meaning as
commonly understood by one of ordinary skill in the art to
which this disclosure belongs. It will be further understood
that terms used herein should be interpreted as having a
meaning consistent with their meaning in the context of this
specification and the relevant art and will not be interpreted
in an idealized or overly formal sense unless expressly so
defined herein.

It is to be understood that the present disclosure is not
limited to the aspects described above and illustrated in the
drawings; rather, the skilled person will recognize that many
changes and modifications may be made within the scope of
the present disclosure and appended claims. In the drawings
and specification, there have been disclosed aspects for
purposes of illustration only and not for purposes of limi-
tation, the scope of the disclosure being set forth in the
following claims.

What is claimed is:

1. A computer system comprising processing circuitry
configured to:
obtain topographic data containing information about
topography of a road along which a heavy-duty vehicle
is currently travelling, the topographic data including
information about an upcoming downhill slope;
acquire prediction data indicative of braking requirements
for the upcoming downhill slope, the braking require-
ments including how much brake power and/or brake
energy will be needed in the upcoming downhill slope
to maintain speed of the heavy-duty vehicle at or below
a selected speed limit of the heavy-duty vehicle
throughout travel in the downhill slope;
determine effects of each of a plurality of brakes on the
brake power and at least one of exhaust gas temperature
or resulting temperature of a Selective Catalytic Reduc-
tion System (SCR), the plurality of brakes comprising
service brakes and a plurality of auxiliary brakes;
determine, using a brake blending model, a brake blend-
ing combination of the plurality of brakes which allows
the SCR of the heavy-duty vehicle to be kept as warm
as possible while still fulfilling the braking require-
ments, the brake blending combination including a
concurrent brake blending of the service brakes and a
plurality of different types of auxiliary brakes;
determine a current temperature of the SCR or an
expected temperature of the SCR in the upcoming
downhill slope is below a predefined threshold tem-
perature; and
upon determining that the determined current or expected
temperature of the SCR is below the predefined thresh-
old temperature, apply the determined brake blending
combination to the heavy-duty vehicle while travelling
along the downhill slope.

2. The computer system of claim 1, wherein the plurality
of auxiliary brakes comprises a retarder, exhaust brake,
and/or engine brake.

3. The computer system of claim 1, wherein the process-
ing circuitry is further configured to upshift gears for the
travel along the downhill slope in addition to applying the
determined brake blending combination.

4. The computer system of claim 1, wherein the brake
blending model implements cost functions where the control
target is to minimize the cost.

5. The computer system of claim 1, wherein the brake
blending model is stored in a remote server which is
accessible by the heavy-duty vehicle.

6. The computer system of claim 1, wherein the brake
blending model is stored in the processing circuitry, onboard
the heavy-duty vehicle, wherein the brake blending model is
uploadable to a remote server, enabling sharing of the brake
blending model with other heavy-duty vehicles.

7. The computer system of claim 1, wherein the process-
ing circuitry is further configured to:
access stored historical control data representing previous
control actions by the processing circuitry; and
determine the brake blending combination based on the
accessed stored historical control data.

8. The computer system of claim 7, wherein the historical
data includes information acquired during different brake
events of the heavy-duty vehicle and/or information
acquired during different brake events of one or more other
heavy-duty vehicles, the acquired information including
information about the change in temperature of the SCR
during the different brake events and different combinations
of brake blending.

9. A heavy-duty vehicle comprising the computer system of claim 1.

10. A computer-implemented method of controlling, for a heavy-duty vehicle traveling along a road, a temperature of a Selective Catalytic Reduction System (SCR) which forms part of an Exhaust After-Treatment System (EATS) of the heavy-duty vehicle, the method comprising:

obtaining, by processing circuitry of a computer system, topographic data containing information about topography of the road along which the heavy-duty vehicle is currently travelling, the topographic data including information about an upcoming downhill slope;

acquiring, by the processing circuitry, prediction data indicative of braking requirements for the upcoming downhill slope, the braking requirements including how much brake power and/or brake energy will be needed in the upcoming downhill slope to maintain speed of the heavy-duty vehicle at or below a selected speed limit of the heavy-duty vehicle throughout travel in the downhill slope;

determining, by the processing circuitry, effects of each of a plurality of brakes on brake power and at least one of exhaust gas temperature or resulting temperature of the SCR, the plurality of brakes comprising service brakes and a plurality of auxiliary brakes;

determining, by the processing circuitry using a brake blending model, a brake blending combination of the plurality of brakes which allows the SCR to be kept as warm as possible while still fulfilling the braking requirements, the brake blending combination including a concurrent brake blending of the service brakes and a plurality of different types of auxiliary brakes;

determining, by the processing circuitry, a current temperature of the SCR or an expected temperature of the SCR in the upcoming downhill slope is below a predefined threshold temperature; and upon determining that the determined current or expected temperature of the SCR is below the predefined threshold temperature, apply the determined brake blending combination to the heavy-duty vehicle while travelling along the downhill slope.

11. A non-transitory computer-readable storage medium comprising instructions, which when executed by the processing circuitry, cause the processing circuitry to perform the method of claim 10.

* * * * *